A. R. WYLIE & J. G. WRIGHT.
VEHICLE WHEEL.
APPLICATION FILED NOV. 11, 1912.
1,083,976.
Patented Jan. 13, 1914.
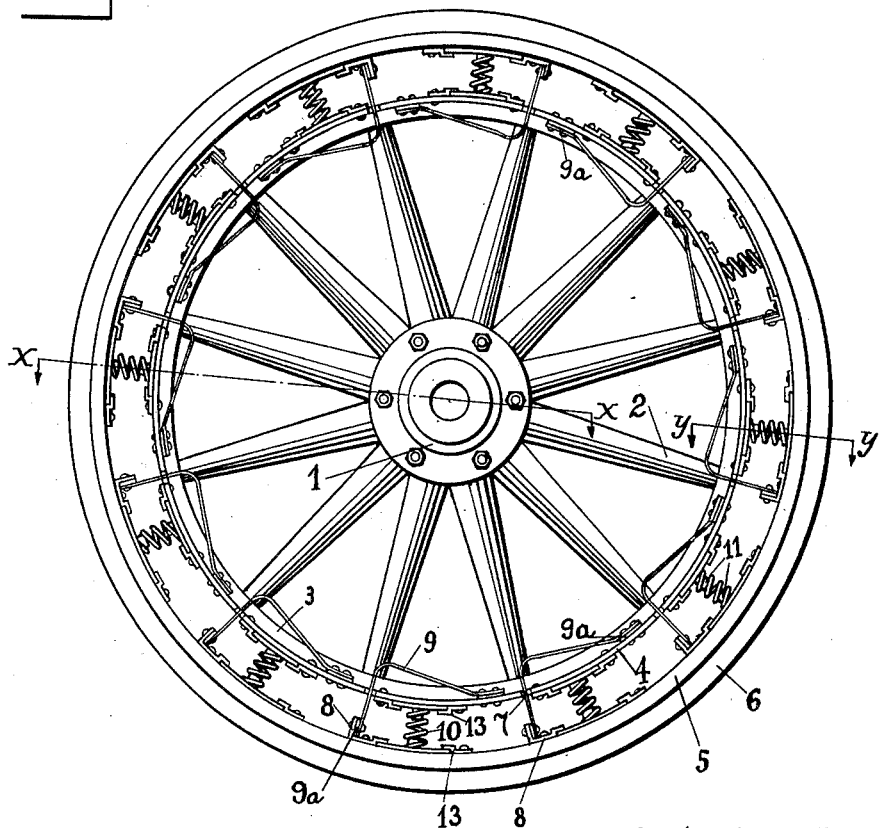
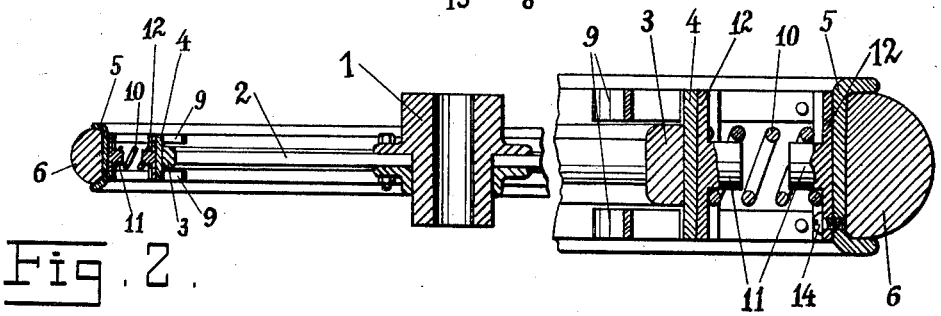
WITNESSES:
H. Victor
Wm. Bruckner
INVENTORS
Alfred R. Wylie,
James G. Wright,
BY
John M. Spellman
ATTORNEYS

UNITED STATES PATENT OFFICE.

ALFRED R. WYLIE AND JAMES G. WRIGHT, OF BIG SPRING, TEXAS.

VEHICLE-WHEEL.

1,083,976.        Specification of Letters Patent.        Patented Jan. 13, 1914.

Application filed November 11, 1912. Serial No. 730,576.

*To all whom it may concern:*

Be it known that we, ALFRED R. WYLIE and JAMES G. WRIGHT, citizens of the United States, residing at Big Spring, in the county of Howard and State of Texas, have invented certain new and useful Improvements in Vehicle-Wheels, of which the following is a specification.

Our invention relates to new and useful improvements in vehicle wheels, and relates more particularly to a wheel for use on automobiles. Its object is to provide a vehicle wheel having embodied in its construction a plurality of springs, by which the same resilient effect is secured in travel that in the present practice is obtained by the use of pneumatic tires.

The object is more specifically to provide a vehicle wheel having an inner and outer rim spaced from each other, the inner rim being rigid with the frame of the wheel, and the outer rim being connected therewith by a plurality of springs, so arranged as to absorb the force of any shock communicated to the outer rim of the wheel in transmitting said shock to the axle of the vehicle upon which the wheel is mounted.

Finally the object of the invention is to provide a device of the character described, that will be strong, durable, simple and efficient, and comparatively easy to construct, and also one, the various parts of which will not be likely to get out of working order.

With these and various other objects in view, our invention has relation to certain novel features of the construction and operation, an example of which is described in the following specification and illustrated in the accompanying drawing, wherein:

Figure 1 is a view of the wheel in front elevation. Fig. 2 is a transverse, sectional view taken upon the line X—X of Fig. 1, and showing one-half of the wheel. Fig. 3 is a detail, sectional view of the rim portion of the wheel, the section being taken upon the line Y—Y of Fig. 1.

Referring now more particularly to the drawing, wherein like reference characters designate similar parts in all the figures, the numeral 1 denotes the hub; 2, the spokes; and 3 and 4, the component members of the inner rim of the wheel, the member 3 having the nature of a wooden ring or felly secured to the spoke extremities, and the member 4 being a metal ring having its edges projecting laterally beyond the edges of the ring 3. The outer or floating rim of the wheel is designated by the numeral 5, and is resiliently supported in its proper spaced relation to said inner rim by a plurality of springs, presently to be described. A solid rubber tread member 6 is carried upon the floating rim 5, the lateral edges of said rim being bent outwardly to form flanges for the purpose of retaining the tread member against lateral displacement. Adjacent to the outer extremity of each spoke, the inner rim member 4 is provided with two oppositely disposed slots 7 in its lateral edges. In radial alinement with each pair of slots 7, an angular bracket 8 is mounted fast upon the inner surface of the outer rim 5. To each bracket 8 there are secured the outer extremities of a pair of springs 9 which respectively project through the two adjacent slots 7, and have their center portions bent at an angle slightly more acute than a right angle, the other extremities of said springs being rigidly secured to the inner surface of the member 4, at each side of the member 3. A non-metallic washer $9^a$ is interposed between the outer extremity of each spring 9 and the bracket 8 to which said extremity is secured, and a similar washer is interposed between the other extremity of each spring 9 and the rim member 4. The function of the washers $9^a$ is to prevent the extremities of the springs 9 being subjected to what is commonly termed crystallization, the word in this usage signifying a pressure so great as to gradually weaken and finally break the affected part. These washers may be formed of rubber, leather, or any other suitable non-metallic substance. A further resilient connection between the inner and outer rims of the wheel is provided by a plurality of coiled springs 10, one of which springs is radially interposed between each adjacent pair of springs 9. The extremities of each spring 10 are mounted upon pins 11 integrally carried by plates 12 respectively mounted upon the inner face of the outer rim 5 and upon the outer face of the inner rim member 4. Each plate 12 is held in its proper relation to the adjacent rim by a pair of brackets 13, rigidly mounted upon the rims 4 and 5, and overhanging those edges of the correlated plates 12, which edges are parallel to the axis of the wheel. By the employment of this construction, it is made possible to easily withdraw any one of the plates 12 by a displacement transverse with the rim of the wheel. Each plate is prevented from undergoing such a displacement as the result of some accidental cause by a screw 14 passing through the plate and through the adjacent rim, which screw must first be removed before the plate can be laterally displaced.

An important feature of the above-described invention lies in the fact that the construction employed to establish a resilient connection between the inner and outer rims of the wheel does not embody any pivotal joints, which would rapidly wear as a result of being subjected to a constant friction while in use and would thus tend to render the wheel short lived and impractical.

The springs 9 and 10 which are interposed between the two rims of the wheel serve not only to mitigate the force of radially acting shocks, such as are produced by obstacles in the path of the wheel, but also decrease the jar resulting from starting or stopping the vehicle with which the wheel is correlated, since the two rims may undergo a slight rotation relative to each other, as the vehicle starts or stops.

The invention is presented as including all such modifications and changes as properly come within the scope of the following claims.

What we claim is:

1. In a resilient vehicle wheel, the combination with a hub, and radial spokes extending from the hub, of an inner rim fixed on the ends of the spokes and having transverse opposed marginal slots, an outer rim member carrying a tread and spaced from the inner rim member, cushioning members between the two rim members, and angular springs arranged in pairs at opposite sides of the wheel, each spring having one end secured to the inner rim member, and a radial portion extending through the slots of the inner rim and secured at its outer end to the outer rim member.

2. In a resilient vehicle wheel, the combination with a hub and radial spokes extending from the hub, of an inner rim fixed on the ends of the spokes and having transverse opposed marginal slots, an outer rim member carrying a tread and spaced from the inner rim member, cushioning members between the two rim members, angular springs arranged in pairs at opposite sides of the wheel, each spring having one end secured to the inner rim member, and a radial portion extending through the slots of the inner rim and secured at its outer end to the outer rim member, and non-metallic washers interposed between ends of the springs and their respective rim members.

3. In a resilient vehicle wheel, the combination with a hub, and radial spokes extending from the hub, of an inner rim fixed on the ends of the spokes and having transverse opposed marginal slots, an outer rim member carrying a tread and spaced from the inner rim member, cushioning members between the two rim members, and angular springs at each side of the wheel, each spring having one angular leg directed substantially circumferentially of the wheel and secured at its free end to the inner rim member, the other angular leg of each spring being directed outwardly from the first leg through the adjacent slot of the inner rim member and having its free end secured to the outer rim member.

In testimony whereof we have signed our names to this specification in the presence of two subscribing witnesses.

ALFRED R. WYLIE.
JAMES G. WRIGHT.

Witnesses:
JAMES T. BROOKS,
W. BENNETT.

---

Copies of this patent may be obtained for five cents each, by addressing the "Commissioner of Patents, Washington, D. C."